Sept. 4, 1951      J. VAN DER TOGT      2,566,644
METHOD FOR MANUFACTURE OF METAL BASKETS
Filed April 10, 1947
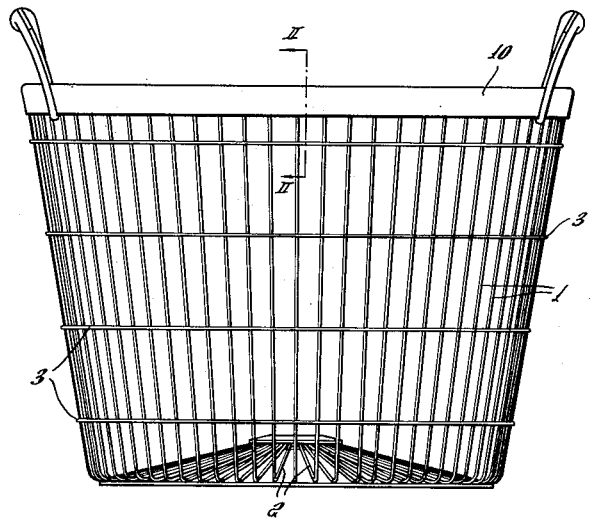
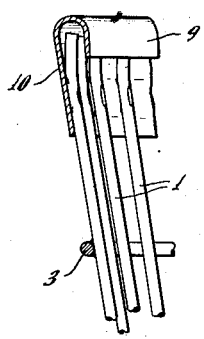 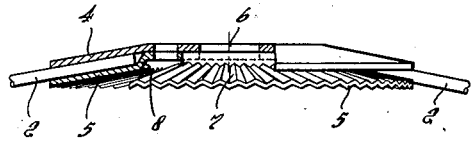
INVENTOR.
Jan Van Der Togt
BY
*attorneys*

Patented Sept. 4, 1951

2,566,644

UNITED STATES PATENT OFFICE 2,566,644

METHOD FOR MANUFACTURE OF METAL BASKETS

Jan van der Togt, Zwijndrecht, Netherlands, assignor to Vennootschap onder de firma Tomado, Zwijndrecht, Netherlands, a partnership of the Netherlands Application April 10, 1947, Serial No. 740,618
In the Netherlands October 24, 1942

Section 1, Public Law 690, August 8, 1946
Patent expires October 24, 1962

2 Claims. (Cl. 140—71)

The metal baskets known in agriculture are provided with a central bottom disc, to which the ends of radial pieces of wire extending upwardly as wall-wires are welded one by one, or a plurality thereof simultaneously. At any rate a plurality of welding-operations is always necessary for welding all of the ends of the radial pieces of wire to the bottom disc. This method is therefore time-consuming.

The known metal baskets further have an upper edge to which the upper ends of the wall-wires are welded. This welding-operation is effected when the upper edge still possesses a flat shape or has been angularly bent only. After the welding-operation the upper edge by a separate operation has to be folded inwardly against the inner side of the wire-ends. This method of attachment is also time-consuming.

The invention has for its object to considerably accelerate the method of manufacture.

For the manufacture of metal baskets, provided with a central bottom to which the end of radial wire-pieces forming bottom-wires extending upwardly as wall-wires, according to the invention a method is carried out according to which the end of the wires in question are, preferably electrically, welded in one single welding-operation between an upper bottom-disc and a lower bottom-disc.

For the manufacture of metal baskets having an upper edge in the form of a reversed gutter into which the upper ends of the wall-wires are inserted, according to the invention a method is carried out according to which it is started from an edge having a J-shaped cross-section, the upper ends of the wall-wires being inserted into the circular groove of this edge, while the welding-operation is effected from the exterior to the long leg of the edge. The separate bordering or folding-operation of the known method has now become superfluous.

The welding of the ends of the radial bottom-wire-pieces between the two bottom-discs referred to above may be effected as follows: The basket is placed upside-down so that the upper central bottom-disc is located underneath. This disc is supported by a gauge and while the wall-wires are kept in place in gauge the ends of the radial bottom wire pieces are put in place on the said upper disc; the lower central disc (which is now located above) is then placed upon these ends and the two discs are provisionally fixed to one another by means of a screw-connection through a central hole made in each one of the discs; then the welding under pressure is effected in one or more operations depending on the weight of the welding machine. The lower disc and/or the upper disc may be provided beforehand with radial grooves in its circumferential edge, the number of these grooves corresponding to that of the wire ends which will have to be welded between the two discs.

The upper edge having a J-shaped cross-section may be put in place by sliding it downwardly around the wall of the basket, when the latter is placed upside down, till the free ends of the wall-wires are brought in engagement with the groove of the upper edge.

During the welding of the ends of the radial wire-pieces and during the welding of the ends of the wall-wires to the upper edge the wall-wires are placed in a gauge, so that they are maintained in their correct relative positions.

The invention relates also to a metal basket made in accordance with the method above described.

On the annexed drawing an embodiment according to the invention is illustrated by way of example:

Fig. 1 is an elevation of the whole basket.

Fig. 2 is, on a larger scale and partially in section on the line II—II in Fig. 1, an elevation of the upper edge of the basket.

Fig. 3 is, also on a larger scale, an elevation, partially a section, of the central bottom-piece.

On the drawing 1 indicates the wall-wires and 2 the radial bottom-wire pieces, forming part of the wall-wires 1; the connection between the wall-wires 1 is obtained by means of circumferential wires 3 located in horizontal planes.

The ends of the radial wire pieces 2 are welded between an upper central disc 4 and a lower central disc 5 of equal dimensions. A central hole 6 in each of those discs serves for the temporary connection of the two discs by means of a screw bolt and a nut. The lower disc 5 is provided with radial grooves 7 in its peripheral edge; there are as many grooves 7 as there are wire ends between the discs. The upper disc 6 may also be provided with grooves. The lower disc 5 is slightly depressed centrally so that a radial boundary for the wire ends is produced in the form of an upstanding edge 8.

The upper ends of the wall-wires 1 are located in the groove or an upper edge having a cross-section in the form of a reversed J; they are welded to the long leg 10 of the upper edge below the short leg 9 located at the inner side.

I claim:

1. A method for manufacture of metal wire baskets having a two piece central bottom composed of an upper and lower part to which the ends of the radial pieces of wire forming the bottom wires and extending upwardly as wall wires are welded comprising supporting the wall wire portions in a gauge in an inverted position, placing the ends of the radial wire pieces on the upper portion of said bottom piece and arranging them in spaced radial grooves located therein, placing the lower portion of said bottom piece over the said ends and superimposed on the upper portion, temporarily securing the two portions of said bottom piece, and welding said ends to said portions by pressure welding in a single operation.

2. In a method as claimed in claim 1 and wherein an upper edge for said basket having a J-shaped cross-section is passed down over the bottom with the short leg thereof inwardly while said basket is in inverted position and slid downwardly around the wall of the basket until the free ends of said wall wires are engaged in the groove formed by said upper edge behind said short leg, and said wire ends are subsequently welded to the long leg of said edge.

JAN VAN DER TOGT.

REFERENCES CITED

The following references are of record in the file of this patent:

UNITED STATES PATENTS

| Number | Name | Date |
|---|---|---|
| 577,151 | Taylor | Feb. 16, 1897 |
| 1,040,418 | Rietzel | Oct. 8, 1912 |
| 1,344,125 | Fulda | June 22, 1920 |
| 1,444,529 | Schroeder | Feb. 6, 1923 |
| 1,472,598 | Jarvis | Oct. 30, 1923 |
| 1,477,700 | Fuller | Dec. 18, 1923 |
| 1,484,696 | Wulftange | Feb. 26, 1924 |
| 1,815,982 | Little | July 28, 1931 |
| 1,897,803 | Herbest | Feb. 14, 1933 |
| 1,934,765 | Julien | Nov. 14, 1933 |
| 2,121,670 | Saives | June 21, 1938 |
| 2,322,704 | Seltzer | June 22, 1943 |
| 2,350,922 | Planeta | June 6, 1944 |
| 2,439,548 | Planeta | Apr. 13, 1948 |

OTHER REFERENCES

Weld. Handbook, 1942, Amer. Weld. Society, p. 322.